United States Patent
Lakk

(10) Patent No.: US 11,329,829 B2
(45) Date of Patent: May 10, 2022

(54) SECURITY FOR SEQUENTIALLY GROWING DATA STRUCTURES

(71) Applicant: Guardtime SA, Lausanne (CH)

(72) Inventor: Henri Lakk, Tartu (EE)

(73) Assignee: Guardtime SA, Lausanne (CH)

( * ) Notice: Subject to any disclaimer, the term of this patent is extended or adjusted under 35 U.S.C. 154(b) by 174 days.

(21) Appl. No.: 16/428,979

(22) Filed: Jun. 1, 2019

(65) Prior Publication Data
US 2020/0382315 A1    Dec. 3, 2020

(51) Int. Cl.
*H04L 9/32* (2006.01)
*G06F 16/907* (2019.01)
*H04L 9/06* (2006.01)

(52) U.S. Cl.
CPC .......... *H04L 9/3247* (2013.01); *G06F 16/907* (2019.01); *H04L 9/0643* (2013.01); *H04L 9/3213* (2013.01); *H04L 9/3297* (2013.01); *H04L 2209/38* (2013.01)

(58) Field of Classification Search
CPC ....... H04L 9/32; H04L 9/3236; H04L 9/3247; H04L 9/3265; H04L 9/3297; H04L 9/06; H04L 9/0643; H04L 9/0618; H04L 9/0625; H04L 9/0631; H04L 9/0637; H04L 63/12; H04L 63/123
See application file for complete search history.

(56) References Cited

U.S. PATENT DOCUMENTS

| | | | |
|---|---|---|---|
| 2005/0114666 A1* | 5/2005 | Sudia ..................... | H04L 9/3247 713/175 |
| 2010/0185847 A1* | 7/2010 | Shasha .................. | G06F 21/606 711/147 |
| 2011/0231671 A1* | 9/2011 | Locker ................. | G06F 21/6209 713/189 |
| 2015/0188715 A1* | 7/2015 | Castellucci ........... | G06F 21/552 713/178 |
| 2016/0254915 A1* | 9/2016 | Jenkinson ............. | H04L 9/3213 713/176 |
| 2018/0367311 A1* | 12/2018 | Stahlberg ............... | H04L 63/101 |
| 2019/0182284 A1* | 6/2019 | Signorini ............ | H04L 63/1408 |
| 2019/0306190 A1* | 10/2019 | Suraparaju ............ | H04L 9/3239 |

* cited by examiner

*Primary Examiner* — Shaqueal D Wade-Wright
(74) *Attorney, Agent, or Firm* — Jeffrey Pearce

(57) ABSTRACT

A log, comprising a sequence of temporally ordered digital entries, is authenticated by entering a new entry into the log only after expiration of a minimum time interval. A digital signature and timestamp are generated for each entry in the log and are included in each respective entry. In a validity verification phase, the timestamp of at least one of the entries is examined to determine whether it indicates entry into the log at a time relative to a preceding entry in the log after less than an expected minimum time interval. If so, a remedial action is taken.

12 Claims, 1 Drawing Sheet

SECURITY FOR SEQUENTIALLY GROWING DATA STRUCTURES

FIELD OF THE INVENTION

This invention relates to a system and method for detecting tampering with sequentially growing, linked data structures.

BACKGROUND

The digital world is defined by events, many of which are or can be logged. For example, in the context of computer systems, syslog implements a standard for logging data events from one or more sources, for example, different network devices, in a central repository. Syslog and its variants may be used for monitoring, analysis, diagnostics, debugging, and more. Variants of syslog extend the basic idea to include, for example, content-based filtering, rich filtering capabilities, flexible configuration options, etc.

Such logs may be maintained not only for "real" computer systems but for virtualized computers ("virtual machines"—VMs) as well; indeed, the system and state changes of VMs themselves may be logged as events. Events are not restricted to computers, of course. As another example, telephone companies routinely log all uses of their subscribers' phones, including any exchange of voice, text, network communications, often including time-tracking, and not only for purposes of billing. In short, any activity that can be represented in a digital form that can be stored can be considered to be a loggable event.

Although the definition is not yet standardized, a "blockchain" is or may also be considered a type of log, in that it is typically a data structure that comprises a series of data "blocks", which encode one or more "transactions", wherein each block is digitally linked, for example, cryptographically, to at least one preceding block, most commonly to the single immediately preceding block. One way to provide this linkage is for each block to pass to its successor block a value computed as a hash of all or some sub-set of its data of the block, including some function of the value it received from its immediately preceding block. In this way, each block includes some information that encodes information from all, or at least one, preceding block. A blockchain is thus a form of log (sometimes referred to as a "ledger")—a log of the transactions that are entered, either individual our grouped, as blocks in the chain.

Increasingly, logs are used not only as diagnostic and analytic tools but also as evidence. In some implementations, in which the log is a blockchain, the log itself may comprise the structure in which actual transaction data is stored. With that trend, the requirements for maintenance and presentation of the log data are growing. Integrity and authenticity, that is, the confidence that the information in the log has not been tampered with or even replaced with another one altogether, are obvious requirements. This is especially true if the log data (often including metadata) is to be used for dispute resolution or produced as evidence in legal proceedings, tax audits, etc., to ensure that data has not been tampered with.

As with any other data structure that may include valuable information, logs are targets of attack. One type of attack involves creating a branch or "fork", that is, a "parallel" sequence, usually beginning with a valid log entry or block. It may then not be possible, at least for outsiders, to know what the correct log sequence is from the point of attack. Even digitally signing events/blocks or groups thereof may not be enough to solve this problem, since an attacker might himself be able to arrange signatures for the elements (blocks/entries/etc.) of the invalid, parallel, sequence. Note that the "attacker" might not even be a malicious third party, but could even be the administrator of the "correct" sequence; for example, a dishonest administrator might deliberately create a "parallel" sequence branch with falsified financial records, effectively creating a set of "double [digital] books", one of which is correct and internal, and the other of which is shown to external auditors. At the system level, a hacker may wish to create a fake system event log, for example, to conceal other unauthorized activity.

One attempt to secure data structures such as logs is to digitally sign either individual events in the log, or, periodically, some collection of events or the entire log. One weakness of this approach is that, in many cases, even the "fake" branch can be "verified" using signatures, since most signature schemes will return signatures for whatever input records are submitted for signatures.

Another known method for securing logs involves implementing append-only storage. Some of the drawbacks of these schemes are that they rely on trust and do not provide any proof to third parties.

It would therefore be advantageous to have some way to prevent such attacks, or at least make them easier to detect and thus harder for them to succeed.

DETAILED DESCRIPTION

Embodiments of this invention impose time constraints on entries into a sequential data structure to make an attack, in particular, a branching or "forking" attack, on the data structure impractical. Merely for the sake of simplicity, conciseness, and example, the term "log" will be used here in most places to indicate the sequential data structure, but should be understood as any data structure that includes separate, temporally ordered elements (such as "entries", "blocks", "events", "records", etc.), and that grows progressively. The elements in the log may be linked to one another sequentially so as to form a linked "list" such as a chain (including but not limited to a "blockchain") in which each element includes data that is derived from the data/metadata of one or more previous entries, or pointers forwards and/or backwards in the chain, etc., although this is not required.

As an alternative, the elements could be unlinked and entered into some other common data structure, for example, a simple list or table, but with a temporal order. One disadvantage of this arrangement is that is becomes easier for an attacker simply to replace an entry without this being detectable in following entries; some other mechanism (such as a digital signature such as with the Guardtime KSI® system) may then be used to sign and timestamp groups of entries to reduce this risk.

Merely by way of example and for convenience, the term "block" is used here, but this should not be read as implying any requirement as to the size or arrangement of whatever information it contains. Unless stated otherwise, "block" may be read as being any kind of entry or grouped entry in the temporally ordered sequence of entries.

Figure 1:
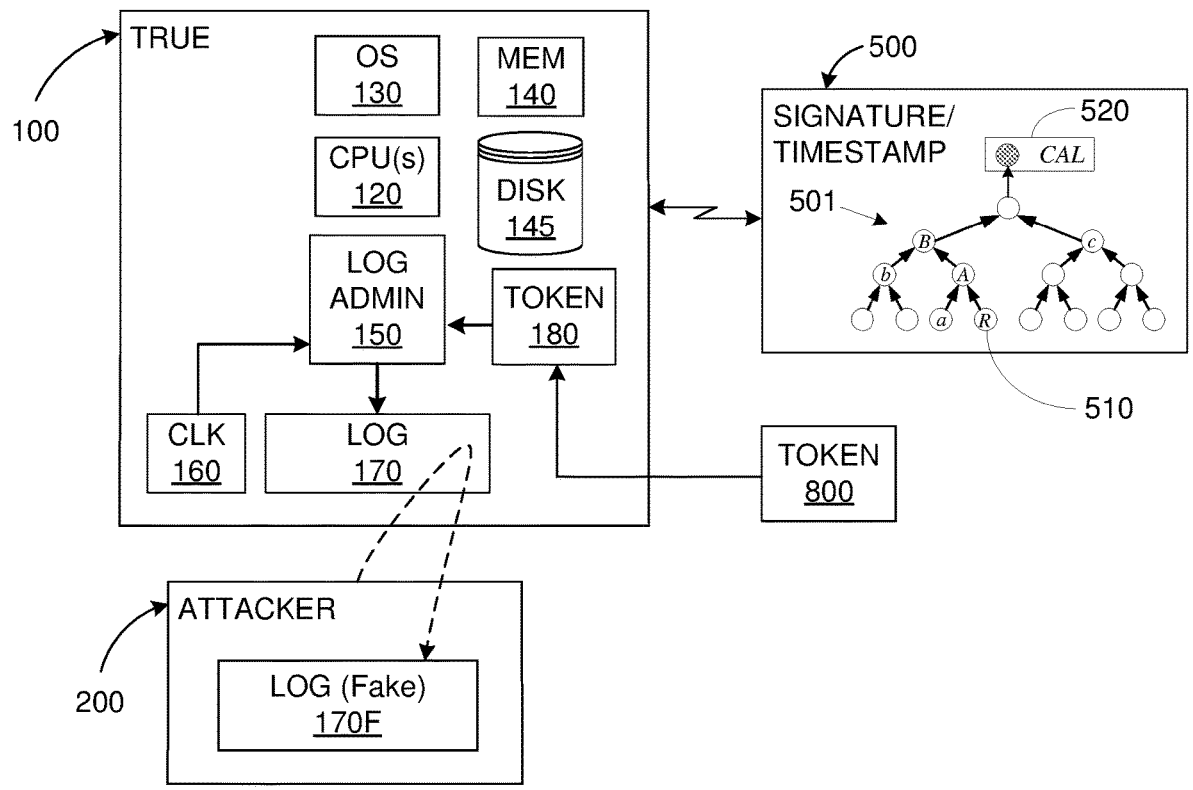
FIG. 1 illustrates some of the main system components used in embodiments to prevent an attacker from being able to successfully create a faked event log.

See FIG. 1, which shows two main systems—a "True" system 100, that is, an "authorized" system, and an "Attacker" system 200, which may be any type of computing system, including servers, personal computing devices, a "cloud"-based system, virtual machines, etc. The True system includes typical hardware and software components such as one or more processors 120, some form of system software such as an operating system 130 (and/or any form of hypervisor in systems that support virtual machines), and some memory and/or persistent storage media 140, 145 that store the non-transitory, processor-executable code that embodies the various software modules and data structures described below. The Attacker system 200 will have similar components, but these are not illustrated specifically. The True and Attacker systems may also be communicating with other systems via a network, in which case they will also include conventional connection and data-transfer devices or circuitry, such as a network interface card.

The True system stores, or at least administers (either solely, or in cooperation with other authorized systems) a log 170, which, as explained above, is a data structure comprising data corresponding to a series of time-ordered events. In the figure, the log 170 is shown as being within the True system 100 itself. In cases where the log 170 is a system log such as syslog this may be the most common configuration, but it would also be possible for the log 170 to be external to the True system 100 as such; for example, the log 170 could be a remotely stored blockchain or database that the True system can access and update using known communication methods. Here, to "administer" the log means that the True system determines which data is to be included in the log, and formats it properly for entry, or otherwise approves entries if these are created by one or more other entities. A log administration software component/module 150 may therefore be included to determine which entries are to be included in the log, to format them properly, and to store them in the log. The True system 100 also includes, or can access, any form of clock 160, which may be the internal system clock, network time, an external time base, etc.

As FIG. 1 illustrates, the Attacker system 200 creates a "fake" log 170F, which it may either store internally, or export or maintain externally.

In some embodiments, log entries, either individually or grouped, may be associated with digital signatures and/or timestamps. In these embodiments, the True system 100 communicates (or includes) a signature and/or timestamping system 500, some options for which are described below. In some other embodiments, for example, in which the log 170 is a time-ordered blockchain, these functions may be intrinsic to the log structure itself and no separate system 500 may be needed.

Figure 2:
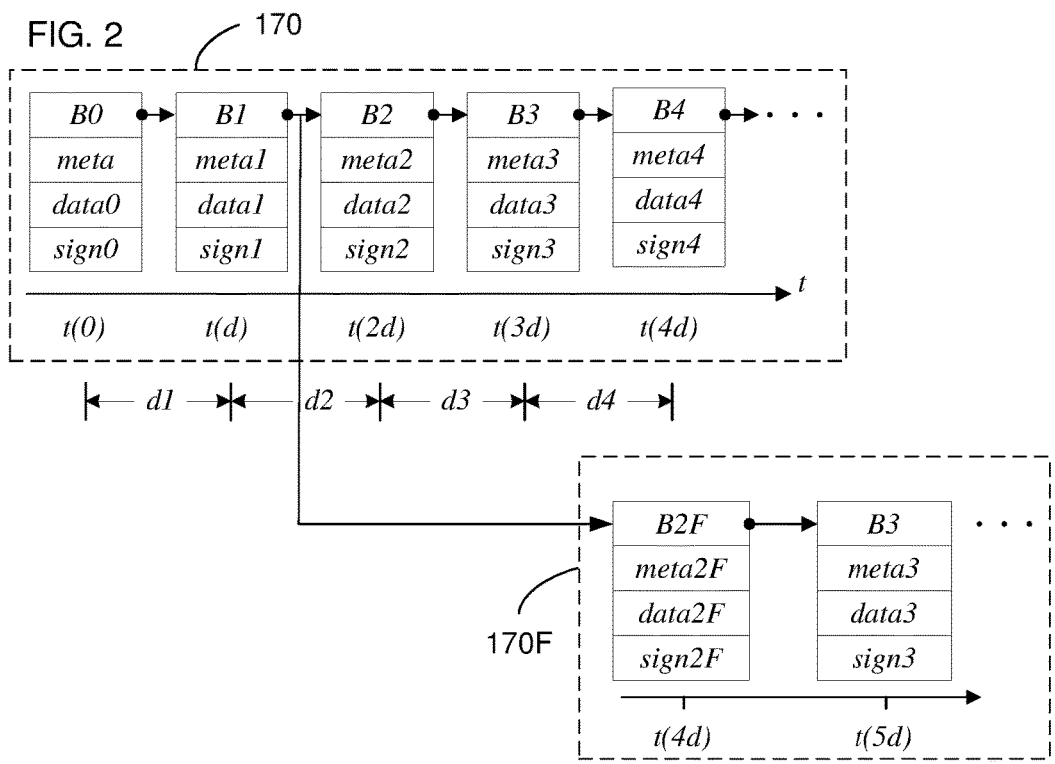
FIG. 2 illustrates how an attempted branching attack is caused to "fall behind" in time.

FIG. 2 illustrates an example of five entries in a series in the log 170. Here, by way of example only, entries are referred to alternatively as "blocks", since they are each shown as comprising various elements, but this is not necessary; system log events, for example, in a structure such as syslog, may be nothing more than a list of indications of system actions. Each block B0, B1, B2, B3, B4 is shown as including respective data, metadata, and a data signature; thus, block Bi (i=0, . . . , 4) includes datai, metadatai, and signi.

The illustrated blocks Bi are linked. One form of link could be a single or double pointer, as in traditional linked lists. For example, B2 could have appended to it a pointer to B3, or B3 could include a pointer back to B2, or both.

To increase security to the level of cryptographic hash functions, however, each block B(i) preferably includes as part of its header or other metadata a cryptographic hash of all or at least some portion of the contents of the preceding block. For example, the metadata of block Bi could include not only the current metadata associated with data set datai, but also H(meta(i-1)), where H is any known hash function such as those in the SHA family of functions and forms the "link" between temporally adjacent blocks. All or part of the data and/or sign of each block could also be hashed (separately or together with the metadata) to form the link passed to the subsequent block. Each link may therefore encode information either from only the immediately preceding block, or from every block from the very beginning of the log and possibly even earlier, from a "genesis" block or seed value, or from any other sub-set of the preceding blocks. Just by way of example, the initial block in the log shown in FIG. 2 is B0. Any alteration of the values in a block that are used to generate its link forward in time will thus be detectable from the point of alteration, since recomputation of the link will yield a result that is different from what was computed when the block was first entered into the log; in short, the hash value will come out wrong.

As shown in FIG. 1, blocks are generated and entered into the log with a constant temporal spacing of d time units, which is the simplest example. Relative to block B0, for example, (taken for example as a reference point at a time t(0)=0), blocks B2 and B4 thus were entered (or signed, or otherwise registered) at times t=2d=t(2d) and t=3d=t(3d) respectively. As is explained below, such even temporal spacing isn't required by the invention.

In a simple embodiment, the signature signi for each block i may be a simple series number; thus, one simple design choice could be for the True system to set signi=i. In another embodiment, groups of, for example, p blocks may instead, or in addition, be signed after every p'th block has been added. As yet another alternative, the entire blockchain may be digitally signed after every new block is added.

One particularly advantageous type of signature signi for each block i (or multiple blocks at once) is the signature returned by the distributed the hash tree infrastructure (the "Guardtime infrastructure") that has been developed by Guardtime As of Tallinn, Estonia. This system is described in U.S. Pat. No. 8,719,576 (Buldas, et al., "Document verification with distributed calendar infrastructure") and is incorporated herein by reference, but may also be summarized as follows.

FIG. 1 and, in particular, the greatly simplified, illustrated tree structure 501 serves to summarize the Guardtime signature technique: for each of a sequence of calendar periods (typically related one-to-one with physical time units, such as one second), the Guardtime infrastructure takes digital input records as inputs. These are then cryptographically hashed together in an iterative, preferably binary hash tree 501, ultimately yielding an uppermost hash value (the "calendar value" CAL 520) that encodes information in all the input records. It then returns a signature in the form of a vector, including, among other data, the values of sibling nodes in the hash tree that enable recomputation of the calendar value if a purported copy of the corresponding original input record is in fact identical to the original input record.

As long as it is formatted according to specification, almost any set of data, including concatenation or other combination of multiple input parameters, may be submitted as the digital input records, which do not even have to comprise the same parameters. In particular, any or all elements in a given block Bi may be submitted as input records to the Guardtime infrastructure, thereby returning a signature sign that itself encodes time to within the precision of the calendar period.

To illustrate: Consider the input hash tree node 510, which may represent a digital input record R (possibly with other or fewer parameters) such as the data, and/or metadata of one or more blocks/entries in the log. Note that a real Guardtime hash tree will typically have very many more input nodes, at least one for each digital input record, and thus many more levels of hash computations. A signature (simplified) vector for the input record R could then be {a, b, c, CAL}, in which a, b, c are the sequential "sibling" values of R and its iterative hash values progressing upwards through the tree. This establishes a computation path from R to CAL as follows: Let g(x, y) be the hash function, having left, right input parameters x and y, applied to form each node. Observe that g(a, R)=A, then g(b, A)=B, then g(B, c)=CAL. Now assume that a record R* is presented as being identical to R. This can be proven or disproven by applying the same signature vector to R*: R*=R iff g(g(b, g(a, R)), c)=CAL. Now if each calendar value CAL is computed according to a known time relationship, such as once per second, then each signature will also correspond to time in that recomputation will lead to a CAL value that represents one calendar period, that is, one time.

A system that implements the hash tree infrastructure of Buldas '576 may be used to implement the signature/timestamping system 500. One advantage of such a signature infrastructure is that it does not depend on the use of public/private keys (such as PKI), and thus has no need to store and maintain them or trust a key-issuing certification authority. This is particularly advantageous in cases where a potentially large number of records needs to be signed, fast, with as little overhead as possible. System events in a syslog are an example of such a context—even if these are signed as groups (for example, hashed as a set, or reduced to a single input via a local hash tree), it would require too much time and administrative effort to obtain and maintain key pairs for each event/group.

Instead, each Guardtime signature is in practice a vector of values that include parameters enabling recalculation of values pairwise upwards through the hash tree created at each of a sequence of calendar times to a top-most calendar value. Given the same input and the Guardtime signature, which may contain the corresponding calendar value, a verifier can, if desired, independently hash the signature parameters pairwise in an iterative fashion. If the end result matches the calendar value, the input is verified. Another advantage is less apparent: Given the signature vector for a current, user-presented data record and knowledge of the hash function g used in the hash tree, an entity will be able to verify (through hash computations as indicated by the signature vector) that a "candidate" record is correct even without having to access the signature/timestamping system 500 at all.

For additional security, the Guardtime signatures can be extended after a number of calendar periods up through a progressively growing Merkle tree of calendar values, or a hash-chaining of calendar values, to a publication value that is published in any widely witnessed manner, such as in a printed publication, an online database, in a ledger, in a blockchain, etc. It is also possible to forego the accumulation of calendar values via a Merkle tree and instead enter each calendar value into some widely witnessed data structure such as a blockchain-backed ledger; indeed, the Guardtime KSI calendar itself has a structure that may be characterized as a blockchain, and may itself be sufficient even without additional hashing using a Merkle tree and publication.

Another advantage is that signature generated using the Guardtime infrastructure encodes an essentially irrefutable timestamp as well. Yet another advantage is that, if the event verification module containing the Guardtime infrastructure is external to the acquisition and reception systems, then the integrity of its state is still independently verifiable. Still another advantage of the Guardtime infrastructure is that the signatures it generates can be verified without having to query the Guardtime infrastructure itself again, although this is an option.

Although the advantages of Guardtime signatures are clear, it would also be possible to use any other known signature scheme to implement the functions of the subsystem 500.

Now assume that an attacker (via, for example, the Attacker system 200) wishes to alter, that is, fake, a previous entry in the log 170, for example, B2. In other words, the attacker wishes to fake a past event, and to establish an unauthorized, parallel log branch 170F from that point. Thus, as illustrated in FIG. 2, the attacker has started a fake log branch from block B1 just after time t(d), and has generated the "fake" block B2F, with components (meta2F, data2F, sign2F). The attacker could fake even more blocks, but assume that he is able to continue the "fake" branch with valid blocks after the first fake one. Thus, after B2F come what appear to be "authentic" blocks B3, . . . . Depending on the chosen signature scheme, the attacker may even be able to generate a valid—or seemingly valid—signature sign2F for B2F. Using conventional techniques, outsiders examining the fake log 170F may not be able to detect that it includes a faked block, especially if the linking structure has been correctly replicated, such that the transition from block B1 to block B2F may appear correct, and the signature sign3* obtained for the otherwise "correct" block B3 that links from B2F verifies.

Note that the True and Attacker systems may be one and the same. For example, a disreputable company may itself try to keep "double books", one that is accurate and another that is in some sense falsified to deceive, for example, auditors. Similarly, the entity that administers the true log 170 may want to alter some event (B2→B2F) but present for verification a log 170F that, in all other normal respects appears correct. Note that the invention does not presuppose maliciousness; rather, embodiments may be used to increase the trustworthiness of the log by making it more securely verifiable.

To combat the possibility of log branches that include falsified past event entries, in embodiments of the invention, a minimal interval of δ time units (such as, for example, δ=1 second) is imposed by the log administration module 150 for signing and entering blocks into the log 170, such that a current time may be used as a trust anchor for verification. In order to verify the integrity of the whole chain, or any portion beyond a chosen entry, a verifying entity may examine if the time between any adjacent block signature pair is never less than δ, and the signing times must be in ascending order; if "placeholder" blocks are included even during periods in which no actual data blocks need to be entered, then the blocks in the log will have time associations (such as timestamps) that strictly increase by at least δ.

Even though some entity (such as Attacker 200) may change a block entered into the log in the past, time will have moved on to the present, and unless the attacker created a fake block immediately, in the same period as the correct one, then time will be more than one unit advanced. For example, even though block B2F may have been linked from block B1, time may have progressed to t(4d) by the time B2F is signed. The timestamp given to block B2F will therefore be "off", that is, more advanced in time than simply one unit beyond block B1.

There are different ways to determine the signing times. One is simply for the administration module 150 to include a time indication as part of a block's metadata; the time indication could come from the internal clock 160, from a network time, or from some other internal or external time base. In order to reduce the ability of even the administrator to alter past blocks, inserting a past time into metadata, it is preferably to use an external, verifiable timestamp such as from the system 500. As mentioned, if this is a digital signature infrastructure of the type provided by Guardtime, the signature sign itself will also encode time verifiably to the precision of the calendar period and cannot be changed retroactively.

The verification process itself may take a significant time (more than δ time units). In some cases this may not be a problem—for example, verification may be needed only up to a given completed time, for example, from the time a process has been started until it has completed execution, or for transactions for a financial quarter, etc. If verification is to be more continuous, to include even entries made after verification has started, the value of the verification time may be updated before verifying each block.

To illustrate, see again FIG. 2 and assume that the signature/log entry time for each block Bj relative to the previous block is $dj \geq \delta$. In FIG. 2, all dj are shown as being constant $dj=d$, but this is not necessary and, in cases of network or signature acquisition latency, may not always be the case. If the first signature on block B0 was taken at $t0=t(0)$, then the following blocks B1, B2, . . . Bn must have been signed respectively at times:

$$t1 = t0 + d1,$$
$$t2 = t1 + d2 = t0 + (d1 + d2)$$
$$\ldots$$
$$tn = t(n-1) + dn = t0 + (d1 + d2 + \ldots + dn) \geq t0 + n\delta$$
$$\text{In general, } tn = t0 + \sum_{j=1}^{n} dj, \text{ where all } dj \geq \delta$$

This introduces an additional factor for verifying the log 170: For each block Bk, the time at which it was signed, or otherwise timestamped, must be at least $tk=t0+k\delta$.

Now assume that the current time is $t=t0+kd \geq t0+k\delta$ and an attacker wants to alter a past authorized block Bm to and create an unauthorized, "fake" block BmF, possibly in a separate log branch. By way of a simple example (see FIG. 2), assume that the attacker wishes to substitute block B2F instead of the correct B2. But assume that real time has progressed to t4 when B2F is created and entered into the "fake" log branch 170F. The attacker must then wait at least a time δ before entering the next block, which, even if it contains identical data data3 as the correct block B3, will need to include the link from B2F and be signed (which may encode time as well). But real time will have progressed to t5 by the time B3 is included in the log branch 170F. Therefore, it becomes increasingly more difficult to re-sign blocks the older they are and even recent blocks are difficult to re-sign as time ticks away and is not reachable.

Note that the attacker will not be able simply to substitute B2F for B2 in the log branch 170, because, not only will any time encoded in the signature be out of chronological order, but the link to the next block will also be incorrect.

To prevent an attacker from deleting the first blocks, in an embodiment, an index is added to each block of the chain. This can be achieved by adding a value to the block's meta-data element or by calculating a hash value from the input hash to the block and the binary representation of the index, with the result being included in the first (or in general n-th, if this is needed) block of the hash chain.

As a simple example, assume that the first block B0 is given the sequence number 0. If an attacker were to try to delete this first block, he would need to re-timestamp all following blocks to start the log from sequence_number=0 again, with following blocks having correspondingly increasing sequence numbers, such as each block's sequence number simply being incremented by 1, with at least the minimal time delay between each consecutive pair of sequence numbers/blocks. But this will be impossible, since time will already have moved on and the malicious administrator will not be able to create a parallel log in which the blocks have "caught" up with real time.

A verifier must be aware of the method used to generate the sequence numbers (indices) and should verify that the chain begins with the index 0 and every following block index is incremented exactly by one (or whatever increment is chosen). Additionally, assuming that a sequence number is to be generated for each block, and that blocks are generated with maximum time differences as well, the time difference should also not be too great. If there exist two blocks that have a significant difference in the time of signing (difference is greater than some chosen threshold, such as $\geq 2^* \delta$), the verification process may the issue warnings and the system 100 should take any chosen remedial action, such as issuing a notification to an administrator, stopping further additions and possibly even reads of the log 170 (since they may not be reliable), testing data signatures (such as KSI signatures) of individual blocks or of the log as a whole to detect at what point a block was added after too great a delay, etc.

Note that, if the Guardtime KSI system is used as the signature service 500, and log 170 could be synchronized with the KSI system, such that each block (or group of blocks) corresponds to one KSI calendar period, or some known number of such periods, then the sequence numbers for blocks may be encoded in each block's KSI signature simply by including the index/sequence number as part of the metadata of the message being KSI signed. This would then provide a "built-in" block sequence number within the irrefutable signature/timestamp.

A block having too great a delay relative to the previous block (that is, its addition exceeds the maximum threshold, if included) is not necessarily fake; instead, this may simply be a trigger to take the chosen remedial action. For example, depending on the nature of the log and what information is included in blocks' metadata, the remedial action may be a further analysis of the contents and origin of the block, such as a check of the credentials (such as PKI key) of the submitter. As another example, if the log administrator 150 is made aware, by normal means, that there is unusual network delay, or a deliberate pause in loggable system activities, or some other "benign" system condition, etc., this may indicate that the excessive delay is acceptable, that is, the risk of accepting the log despite the excessive block time gap is sufficiently low, if such information is included along with log entries, or an analysis of the system state at the time.

If the log passes such additional verification, then one choice would be to accept new blocks and to add the estimated or measured extra delay into the correct time for blocks added after the threshold violation.

Network delays, possible signing server 500 downtimes, and other "excusable" factors may thus cause the time difference between consecutive signatures may be greater than δ. The differences may accumulate over g gaps with the total excess period of G=g×δ. This would possibly allows an attacker to sign g extra blocks compared to the actual time it took to sign the whole chain, which would in turn possibly enable the attacker to modify and resign the last g-1 blocks and catch up with the correct time for adding the next valid block.

In one embodiment, this risk factor is mitigated by increasing δ before G gets bigger than a chosen value Γ, where Γ is the longest time difference between any two consecutive signatures of blocks, which the log administrator 170 may track. Γ may therefore possibly be increasing constantly, until reset. The log administrator or other component may periodically require personalized signatures by either a user or administrator to reset or redefine δ; the signature should then also be verified during any log verification process. If the system has not been compromised up to a block By when an incident has occurred, it may in some cases not be possible to determine the validity of the previous y-g blocks, but it will be possible to state that blocks B0, . . . , Bz, (z<y-g), are still valid, since the attacker would not have been able to resign those blocks.

If it is anticipated or detected that time gaps greater than the threshold may occur or occurring "naturally" in the system, for example, because of know network or system latencies, or needing to wait for users to submit transactions for new blocks, then the log administrator 150 may maintain a "heartbeat", that is, insert a "null" block before the expiration of each time period δ, if no new data block has been generated. The null block should still, however, include the meta information, be signed (if blocks are signed individually) to obtain sign, and include any other index values, etc., even though the data portion data may include only some null indication.

In yet another embodiment, tokens, that is, data elements unrelated to substantive data intended for registration in the log, either to fill in "gaps" instead of null blocks, or to be added to the metadata of a current block, or both. If the tokens are generated at unpredictable intervals, or with an unpredictable distribution during predetermined periods, or with some temporal or positional distribution indicated only in the tokens themselves, then the presence and distribution of the tokens may be used to reduce the opportunity that an attacker might try to delete blocks. If the tokens are generated at a fixed minimal time interval apart, and if the log itself is (preferably KSI-) timestamped, it will then be possible to verify not only that the tokens are present but also that their minimal time interval requirement was met.

Any known method may be used to generate the tokens, which are used in other systems as well. One example is to generate the tokens as (pseudo-)random numbers. Another option is to compute tokens as hash values from a common seed, optionally also including an index value, time value, or some other unique identifier. Thus, at time tn, the token could be hash(seed||tn). The token could also be a time value itself, signed by an administrative or auditing entity. The tokens may then be sent with at least the required minimal delay for entry into a corresponding block of the log.

In one embodiment, the tokens are generated internally, for example, in a token component 180, which is either part of the log administrator 150 or communicates with it. In another embodiment, the tokens are generated by an external system 800, which then passes the tokens to the system 100, for example, to the module 180, which receives them. During later verification, a verifier may first examine the log to determine whether it includes all the expected tokens and that the timestamp on each has at least the minimal time separation. The verifier may also examine the timestamp of the block in which each token is included—this timestamp should correspond to a time within some maximum allowable difference from the time at which the token was created (if this information is included in the token) and/or entered into the log. Using this scheme, note that even if an administrator were to try to use the same token value in a parallel, fake log, he would still not be able to use the token to attempt to modify blocks in the past, again, because of the requirement for minimum time delays.

In some implementations, parallel branches ("forks") may be intended, and permissible. For example, different systems may be used to perform different portions of some process, after some initial processing (and event logging) that is common to both. If such branching is allowed, then any known mechanism may be used to authorize and log the branch. A separate "timer" may, for example, be applied to each branch so as to prevent attacks on the different branches, with the genesis time of the branch being at the point of branching. In other words, it would be possible to apply the techniques described above to each branch of the log, effectively treating each branch as a separate log.

What is claimed is:

1. A method for securely authenticating a log, the log comprising a sequence of temporally ordered digital entries, the method comprising:
   allowing entry of a new entry into the log only after expiration of a minimum time interval;
   generating a digital signature and timestamp for each entry in the log and including the respective digital signature and timestamp in the respective entry;
   in a validity verification phase, detecting whether the log corresponds to a parallel branch of a valid version of the log by examining the timestamp of at least one of the entries and determining whether the timestamp indicates entry into the log at a time relative to a preceding entry in the log after less than an expected minimum time interval and, if so, taking a remedial action.

2. The method of claim 1, further comprising configuring the log as a blockchain, each entry including as an element of metadata a value computed as a function of a value derived from at least one preceding entry in the log.

3. The method of claim 1, further comprising configuring the log as a linked list, each entry including as an element of metadata a value computed as a function of a value derived from at least one preceding entry in the log.

4. The method of claim 1, further comprising generating the digital signature by submitting a function of each entry as a digital input record to a keyless, distributed hash tree infrastructure system, the signature including values enabling recomputation from the function of each respective digital input record upward through the hash tree infrastructure to a root hash value at a calendar period, the root hash value being the uppermost value of successive hashing of sibling values generated from all digital input records input to the hash tree infrastructure during the calendar period.

5. The method of claim 4, further comprising, in a signature verification phase:

receiving a candidate digital input record corresponding to at least one of the log entries;

recomputing the root hash value with the candidate digital input record and sibling node values in a computation path in the hash tree from the candidate digital record to the root hash value, whereby the candidate digital input record is deemed verified as being identical to the corresponding originally input digital record if the recomputed root hash value is equal to the root hash value obtained when originally computed.

6. The method of claim 4, further comprising setting the minimum time interval as a function of the calendar period.

7. The method of claim 1, further comprising adjusting the minimum time interval according to at least one permissible delay.

8. The method of claim 7, in which the at least one permissible delay includes network latency.

9. The method of claim 7, in which the at least one permissible delay includes signature acquisition latency.

10. The method of claim 1, further comprising:

including a plurality of tokens in respective ones of the entries with at least a predetermined minimum time separation between consecutive ones of the tokens, each of the tokens being a data element generated by an entity other than a creator of the entry; and in the validity verification phase, determining whether the tokens are present in the entities and with the at least predetermined minimum time separation and, if not, taking the remedial action.

11. The method of claim 10, further comprising applying the tokens to randomly selected ones of the entries.

12. The method of claim 10, further comprising applying a pre-determined number of the tokens to a pre-determined number of the entries over pre-determined intervals.

* * * * *